United States Patent [19]

Van Hemert

[11] Patent Number: 5,109,418
[45] Date of Patent: Apr. 28, 1992

[54] METHOD AND AN ARRANGEMENT FOR THE SEGMENTATION OF SPEECH

[75] Inventor: Jan P. Van Hemert, Eindhoven, Netherlands

[73] Assignee: U.S. Philips Corporation, New York, N.Y.

[21] Appl. No.: 825,827

[22] Filed: Feb. 4, 1986

[30] Foreign Application Priority Data

Feb. 12, 1985 [NL] Netherlands .............. 8500377

[51] Int. Cl.⁵ .................. G10L 7/08; G10L 7/02
[52] U.S. Cl. ........................... 381/43; 381/41
[58] Field of Search .................. 381/41–50, 381/36–40, 29–32; 364/513.5

[56] References Cited

U.S. PATENT DOCUMENTS

| | | | |
|---|---|---|---|
| 2,903,515 | 9/1959 | Smith | 381/41 |
| 3,344,233 | 9/1967 | Tufts | 381/41 |
| 4,489,433 | 12/1984 | Suehiro et al. | 381/41 |
| 4,513,435 | 4/1985 | Sak35lt3al. | 381/41 |
| 4,625,287 | 11/1986 | Matsuura et al. | 364/513.5 |
| 4,665,548 | 5/1987 | Kahn | 381/43 |
| 4,672,667 | 6/1987 | Scott et al. | 381/41 |

OTHER PUBLICATIONS

M. Stella, "Fabrication Semi-Automatique de Dictionnaires de Diphones".

"Analyse, Zuinige Codering en Resynthese Van Spraakgelvid".

Elsendorn et al., "Exploring the Possibilities of Speech Synthesis with Dutch Diphones", IPO Annual Report, No. 17, 1982, pp. 63–65.

Rabiner et al., "A Bootstrapping Training Technique for Obtaining Demisyllable Reference Patterns", JASA 7(6), Jun./1982, pp. 1588–1595.

Atal, "Efficient Coding of LPC Parameters By Temporal Decomposition", IEEE ICASSP 83, pp. 81–84.

Philips, "MEA8000 Voice Synthesizrt: Principles and Interfacing", Tech. Public. #101.

Ney, "Dynamic Programming as a Technique for Pattern Recognition", 6th Int. Conf. Pattern Recognition, 1982, pp. 1119–1125.

*Primary Examiner*—Dale M. Shaw
*Assistant Examiner*—John Merecki
*Attorney, Agent, or Firm*—Bernard Franzblau

[57] ABSTRACT

In a method of and an apparatus for the segmentation of speech, an acoustic speech signal is converted into N signals $S_i(f)$, each signal pertaining to a time interval i of N successive time intervals ($1 \leq i \leq N$). For successive time intervals i a function $c_{ij}$ (FIG. 7) is then derived which is a measure of the agreement between the signals in the time intervals i and j. The middle $m_i$ of the pertaining function $C_{ij}$ is determined for each time interval i and those values i are determined which at least approximately correspond to zero-axis crossings with the same sign in a function $d_i$ (see FIG. 3b), $d_i$ indicating the difference between $m_i$ and i. The signal segmented in this way can be used for the derivation of diphones so that a library of diphones can be built up (see FIG. 1), or it can be used for the recognition of the speech utterance (see FIG. 2).

20 Claims, 5 Drawing Sheets

METHOD AND AN ARRANGEMENT FOR THE SEGMENTATION OF SPEECH

BACKGROUND OF THE INVENTION

This invention relates to a method for the segmentation of speech, in which an acoustic speech signal is converted into N signals, each signal pertaining to a time interval i of N successive time intervals, in which i runs from 1 to N inclusive. The invention also relates to an arrangement for carrying out the method.

The method and/or an arrangement of this type is used for determining (the limits of) segments from which speech is built up. These segments are sounds, for example in the form of demisyllables, phonemes or diphones.

The aim of an operation such as this can be, for example, to apply a recognition procedure to the results obtained. In this case one speaks of word or speech recognition. This recognition procedure can means that the segments obtained are compared with sound reference patterns. If there is sufficient agreement between a segment and a sound reference pattern the segment is recognized.

Another possibility can be that the segments obtained are used to build up a collection of sounds which are all different (for example diphones), after which a synthesis of artifical speech can later be made with the aid of this collection, see for example "Exploring the possibilities of speech synthesis with Dutch diphones" by B. A. G. Elsendoorn et al (1). Up to now the building-up of a collection (or library) of diphones for one language has been done manually by a trained phonetician and this takes about one year.

A system for obtaining collections of diphones is known from "Fabrication semi-automatique de dictionnaires de diphones" by M. Stella (2). This semi-automatic method segments only 72% of the diphones effective, so that an operator has to correct the results interactively afterwards.

A segmentation method based on reference patterns of the sounds to be found, namely demisyllables, is described in "A bootstrapping training technique for obtaining demisyllable reference patterns" by L. R. Rabiner et al (3).

A disadvantage of a method such as this is that if accurate reference patterns are to be derived, the building up of a library with such reference patterns takes up a great deal of time. Often just as much time as is needed at present to build up a library of diphones in the known way. This is mainly because the number of reference patterns for a library such as this is very great, namely for the Dutch language approximately 10,000 demisyllables and 1800 diphones.

In his publication "Efficient coding of LPC parameter by temporal decomposition," B. S. Atal (4) also describes a method of segmentation. This method has the disadvantage that the number of segments to be found is not fixed and it does not determine to which sound the segment obtained belongs.

SUMMARY OF THE INVENTION

The invention now aims to provide a method for the segmentation of speech which works more accurately and whereby a collection of, for example, diphones can consequently be obtained in a shorter time.

For this purpose, the method according to the invention is characterized in that for successive time intervals i a function $c_{ij}$ is derived which is a measure of the agreement between a signal pertaining to the time interval i and a signal pertaining to the time interval j, whereby for a certain value of i, j runs from $a_i$ ($a_i<i$) up to and including $b_i$ ($b_i>i$), and those values i, pertaining to a sequential number i of a time interval, are determined which form the boundaries of parts of the speech signal within which time intervals i occur and whose corresponding function $c_{ij}$ approximately correspond. These values i can, for example, be determined because of the fact that for each time interval i the middle $m_i$ of the function $c_{ij}$ pertaining to the interval i is determined, and for the said values i, those values i are taken which at least approximately correspond to zero-axis crossings with the same sign in a function $d_i$, indicating the difference between $m_i$ and the number i of the time interval to which $m_i$ belongs. The values i correspond to points of time during a speech utterance and indicate the boundaries of the segments. If those values i are determined which at least approximately correspond to the zero-axis crossings from negative to positive in the function $d_i$ (where $d_i = m_i - i$), then one obtains the phoneme boundaries.

Consequently the segments are then the phonemes. A segment such as this is characterized in that the speech parameters, such as formants and bandwidths, are more or less constant within this segment.

A phoneme can be defined as being the smallest unit in a word that alters the meaning of the word when it is changed. A diphone describes a transition between two adjacent phonemes in a word. A method for the derivation of diphones will later be described on the basis of the phonemes obtained in the manner described above.

The correlation function could be taken for the function $c_{ij}$. This function has the value 1 for equal time intervals, in other words i=j, and its value decreases as the difference between the sounds at the time intervals i and j becomes greater.

In the method $a_i$ and $b_i$ can be taken equal to those values i for which the function $c_{ij}$ is equal to a reference value $c_r$. The reference value here can be taken equal to p times the maximum value of the function $c_{ij}$, where $0<p<1$, for example, p is equal to 0.8. As a result, corresponding segments in a speech utterance do not influence each other. This means that the determination of the middle $m_i$ of the one segment is not influenced (in other words: is not disturbed) by the presence of another corresponding segment further on or earlier in the speech utterance.

The frequency spectra of the acoustic speech signal in the N time intervals can be taken for the N signals. Another possibility is to take the spectral envelopes of the acoustic speech signal in the N time intervals for the N signals. The method of obtaining spectral envelopes, for example, by means of LPC analysis, is in itself known from "Linear prediction of speech" by J. D. Markel and A. H. Gray (5). The use of the spectral envelopes for the derivation of the functions $c_{ij}$ has the advantage that the influence of pitch, which is in fact present in the frequency spectra themselves, is suppressed.

The method described above therefore results in a speech signal subdivided into segments in which the segment boundaries are determined by the values i, which values in turn indicate the boundaries along the time axis for the segment.

The derivation of a library of diphones will often be achieved by first determining segments in the form of phonemes from a speech signal and then deriving the diphones from the phonemes obtained. For this purpose a speech utterance which is known in itself, and which therefore contains a number of the diphones to be derived, is subjected to the segmentation procedure described above. If the zero-axis crossings in the curve $d_i = m_i - i$ are taken from negative to positive, one then obtains the segment boundaries which should correspond to the phoneme boundaries of the phonemes of which the known speech utterance is composed. It may be that the segmentation procedure will determine as many segments in the speech utterance as there are phonemes in the speech utterance. In that case, it can be indicated precisely which segment corresponds to which phoneme. It may, however, also be the case that the segmentation procedure yields precisely more or fewer segments than the number of phonemes of which the speech utterance is built up. In these cases it is not immediately clear what segment corresponds to what phoneme.

In that case a special allocation procedure is needed whereby in the first case (more segments than phonemes) one or more boundaries will have to be eliminated and in the second case (fewer segments than phonemes) one or more boundaries will have to be added. To enable this to be achieved, the method for the segmentation of the speech signal of a known speech utterance into sound segments, for example in the form of phonemes, is characterized in that by means of a known time alignment a maximum degree of agreement is achieved between a string of reference patterns of those sounds from which the speech utterance is built up and the speech signal of the speech utterance, and that these sounds are allocated to those segments, bounded by the values i, for which the boundaries of sound and the corresponding segment show the best agreement. That is, if the known utterance comprises a string of known reference sounds with a reference pattern available for each known reference sound, the process may further comprise a time alignment step for achieving a maximum degree of agreement between a string of reference patterns corresponding to the string of known reference sounds and the known speech utterance. This is followed by the step of allocating reference sounds in the string of reference sounds making up a speech utterance to segments in the string of segments obtained in the segmentations step. If there are more segments than phonemes, then somewhere in the speech utterance there are two adjacent segments which lie opposite one phoneme. The value i which determines the boundary between these two segments is now omitted. If there are more phonemes than segments, then somewhere in the speech utterance there are two adjacent phonemes which lie opposite one segment. In that case the segment in question is split by adding a value i corresponding to the boundary between the two phonemes.

If there were just as many segments as phonemes, then the values i, as obtained from the function $d_i$, are retained.

Starting from the values i now obtained for the phoneme, the diphone boundaries can be determined by making use of conversion rules.

A reason for determining the diphone boundaries (and hence the diphones) via a derivation from the phoneme boundaries is that the phoneme reference patterns can be used for the above-mentioned time alignment. Since there are only about 40 phonemes for the Dutch language, this means that only 50 reference patterns need be derived and stored, which can be done effectively and quickly.

A further question is why the phoneme boundaries are not simply derived from the above-mentioned time alignment of the speech signal with the string of phoneme reference patterns. The answer to this is that a method such as this is very sensitive to, among other things, co-articulation and chance variations in speech. The result is that phoneme boundaries are obtained which may be highly inaccurate, so that consequently a good derivation of the diphone boundaries or the diphones is not possible.

The above-mentioned time alignment is therefore only intended for allocating segments to phonemes and, if necessary, for adding or omitting boundaries.

The subdivision of the speech signal or speech utterance into segments (for example phonemes) can also be used for the recognition of the speech utterance. For this purpose, the method can be further characterized in that for the recognition of the speech signal of an unknown speech utterance, each segment is compared with reference patterns of known sounds, and in that a sound is allocated to a segment for which the degree of agreement between the segment and the reference sound is maximum. This particularly applies if the speech utterance is segmented into segments in the form of phonemes.

In that case, one need likewise only store the reference patterns of the forty phonemes and compare each of the segments in the unknown speech utterance with a maximum of forty reference patterns. Once the maximum agreement has been determined, the string of reference patterns then indicates from what phonemes the unknown speech utterance is composed.

An arrangement for carrying out the method which includes an input terminal for the reception of an electrical signal corresponding to the acoustic speech signal and a first unit with an input coupled to the input terminal and an output. The first unit includes means for the derivation of the N signals and for supplying these N signals to its output. The arrangement is further equipped with:

a second unit with an input coupled to the output of the first unit and an output, which second unit includes means for deriving the function $c_{ij}$ for successive intervals i from the signals pertaining to the time intervals i and j and for supplying the function $c_{ij}$ to its output, and a sub-arrangement with an input coupled to the output of the second unit and an output, which sub-arrangement includes means for determining those values i which form the boundaries of parts of the speech signal for which the curves $c_{ij}$ pertaining to time intervals lying within one section at least approximately correspond. In this respect, the sub-arrangement can be equipped with:

a third unit with an input coupled to the input of the sub-arrangement and an output, which third unit includes means for deriving the middle $m_i$ of the function $c_{ij}$ pertaining to each interval i and for supplying the values $m_i$ to its output, and a fourth unit with an input coupled to the output of the third unit and an output coupled to the output of the sub-arrangement, which fourth unit includes means for determining those values i which at least approximately correspond to zero-axis crossings in the function $d_i$ and for supplying those values i to its output. With this arrangement it is possible to achieve a segmentation of the speech signal into segments in which the speech parameters are more or less constant. The values i indicate the mutual boundaries of the segments in the form of a sequential number of a time interval. Consequently, these values i correspond to points of time during the speech signal (the speech utterance).

The fourth unit can further comprise means for determining those values i which at least approximately correspond to the zero-axis crossings from negative to positive in the function $d_i$, in which $d_i = m_i - i$. The segments in this case are in the form of phonemes.

An arrangement for the implementation of the method for the segmentation of a known speech utterance into sound segments, for example in the form of phonemes, can further comprise a memory for storing the sound reference patterns and a fifth unit with a first input coupled to an output of the memory, a second input coupled to the output of the first unit and an output. The fifth unit is equipped with means for achieving, by means of a known time alignment, a maximum degree of agreement between a string of reference patterns of those sounds from which the known speech utterance is built up and the speech signal of the speech utterance, and for supplying the boundaries obtained in this way to its output, and a combination unit with a first input coupled to the output of the fourth unit and a second input coupled to the output of the fifth unit and an output. The fifth unit includes means for allocating those sounds to those segments bounded by the values i for which the boundaries of sound and corresponding segment show the best agreement. In this respect, the combination unit can further comprise means for the addition of and the omission of one or more values i, by which is meant just as many values i as there are fewer or more segments than the corresponding sounds and for supplying the changed or unchanged group of values i to its output. As a result of this, starting from reference patterns of between only 40 and 50 phonemes, a certain phoneme can be allocated to each of the segments obtained in the fourth unit, and in addition a correction can be made if the number of segments is smaller than or greater than the number of phonemes of which the known speech utterance is composed.

In order to obtain the diphones, the arrangement can further be equipped with a sixth unit, with an input coupled to the output of the combination unit and an output, which sixth unit—starting from the values i of the combination unit for the sound boundaries and making use of conversion rules—includes means for deriving the diphone boundaries and for supplying these diphone boundaries to its output.

To make it possible to recognize the speech signal of an unknown speech utterance, the arrangement can be further equipped with a memory for storing reference patterns of known sounds and with a fifth unit with a first input coupled to the output of the memory, a second input coupled to the output of the fourth unit and a third input coupled to the output of the first unit and an output. The fifth unit includes means for comparing each segment with reference patterns of known sounds, and for allocating that sound to a segment for which the degree of agreement between said segment and the sound is maximum, and means for supplying to its output information relating to the string of reference patterns of those sounds each of which corresponds maximally with the segment to which they are allocated.

BRIEF DESCRIPTION OF THE DRAWINGS

The invention will be further explained on the basis of the following description of the drawing, which show the following:

FIG. 1 a first example of an embodiment of the arrangement according to the invention, FIG. 2 a second example of an embodiment of the arrangement according to the invention, FIG. 3, in FIG. 3a the electrical signal of the speech utterance as a function of time, in FIG. 3b the curve $d_i$ obtained in the segmentation procedure and in FIG. 3c the phoneme attributed to the segments obtained, FIG. 4 the N spectral envelopes of the speech signal from FIG. 3a for successive time intervals i ($1 \leq i \leq N$), FIG. 5 the frequency spectrum of a speech signal in a certain time interval and the pertaining frequency spectrum envelope, FIG. 6 the function $c_{ij}$ for a certain time interval i ($1 \leq j \leq N$), FIG. 7 the function $c_{ij}$ for successive time intervals i, FIG. 8 in FIG. 8a the function $c_{i,px}$ in FIG. 8b the original time signal of the speech utterance, and in FIG. 8c again the function $d_i$ containing the diphone boundaries 9 and the segment boundaries i, FIG. 9 in FIGS. 9a and 9b the addition of an additional segment boundary and in FIGS. 9c and 9d the omission of a segment boundary, and FIG. 10 the time alignment between the speech utterance and the phoneme reference patterns.

In addition, the description of the figures comprises three tables with rules for converting phoneme boundaries to diphone boundaries for the Dutch, German and English languages.

DESCRIPTION OF THE PREFERRED EMBODIMENTS

Figure 1:
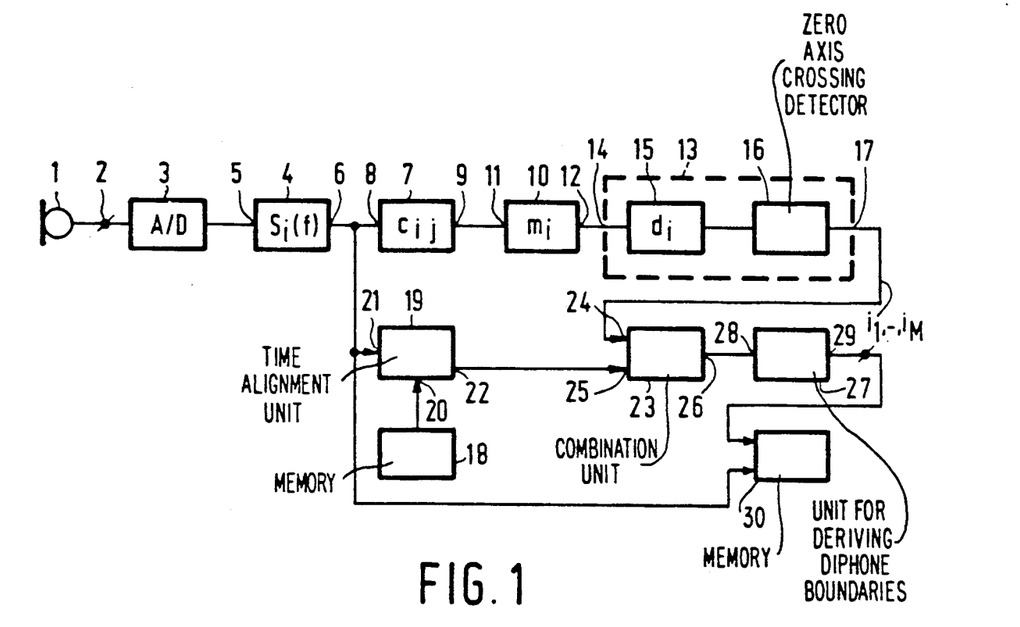
Figure 3:
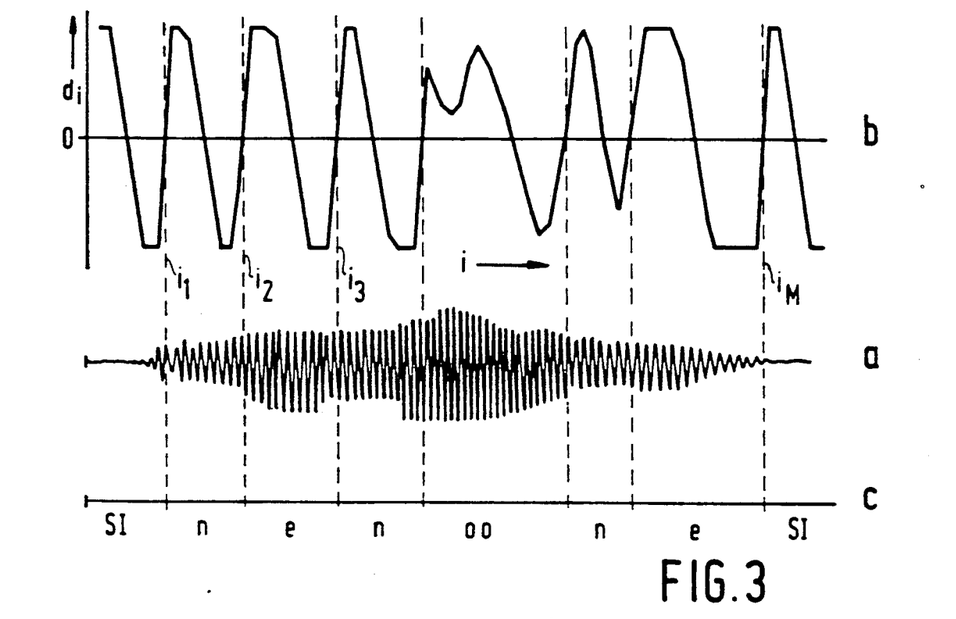

FIG. 1 shows a first example of an embodiment of the arrangement according to the invention. The arrangement is used for deriving a diphone collection. For this purpose, a practised speaker presents a known speech utterance to the arrangement via a microphone 1. In doing so, the speaker should ensure that he speaks at a certain speed. This speed must neither be too great nor too slow. In addition, it is preferable that he speak at a fixed pitch. The speech utterances used for obtaining a diphone collection are generally meaningless words, such as, for example, the word "nenoone". This word is built up from the phonemes "n", "e", "n", "oo", "n" and "e". From this the following diphones can be distilled, namely "ne", "en", "noo", "oon" and "ne". Since diphones in fact indicate the transitions of two phonemes it is clear that there are many more diphones than phonemes. In the case of the Dutch language, approximately 1800 diphones as against approximately 40 to 50 phonemes. The microphone 1 is coupled via the input terminal 2 to the analog-digital converter 3. In this unit the electrical signal is sampled at a sampling frequency of about 10 kHz and digitized. Since the information for speech is mainly located in a frequency range below 5 kHz, the sampling frequency of 10 kHz is adequate. FIG. 3a shows the digitized time signal of the word "nenoone" which appears at the output of the analog-digital converter 3. A first unit 4 has an input 5 coupled to the output of the A/D converter 3. This unit 4 is equipped with means for deriving N signals $S_i(f)$ ($1 \leq i \leq N$). These N signals are obtained by dividing the time signal of FIG. 3a into N intervals and, for example, by taking for each interval the frequency spectrum of the speech utterance in the relevant interval.

Figure 4:
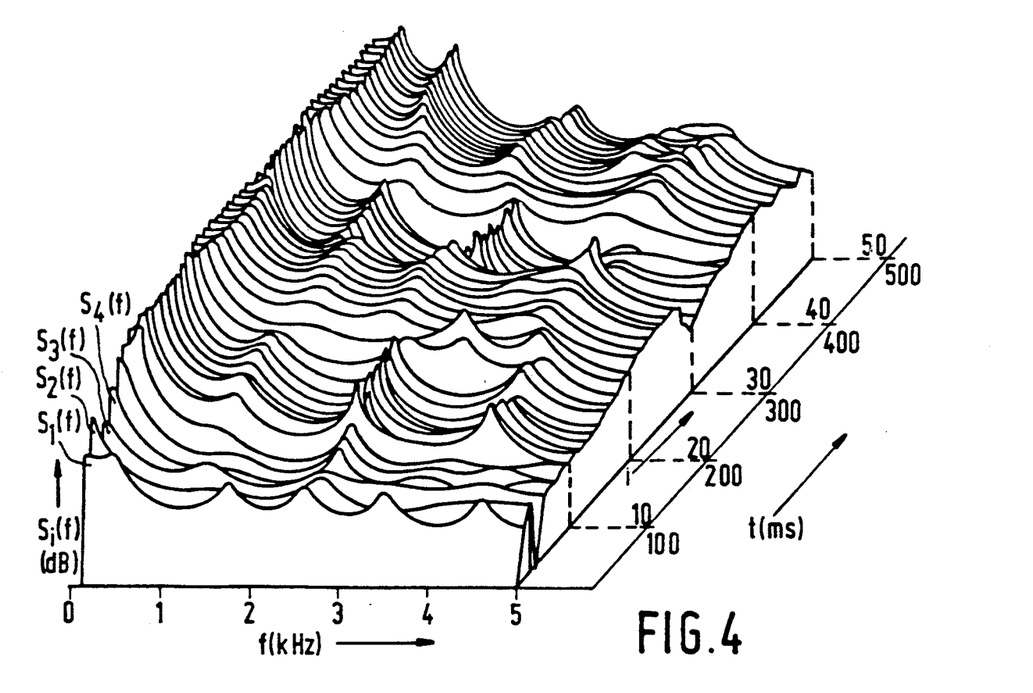

Another possibility is to take the spectral envelope of the speech utterance in the relevant interval. The LPC analysis could be used for this purpose. Assuming that intervals of 10 ms in length are taken, the pertaining spectral envelope is then calculated from a time signal consisting of 100 samplings. FIG. 4 shows the first fifty spectral envelopes $S_i(f)$ for the first 500 ms of the speech signal.

Figure 5:
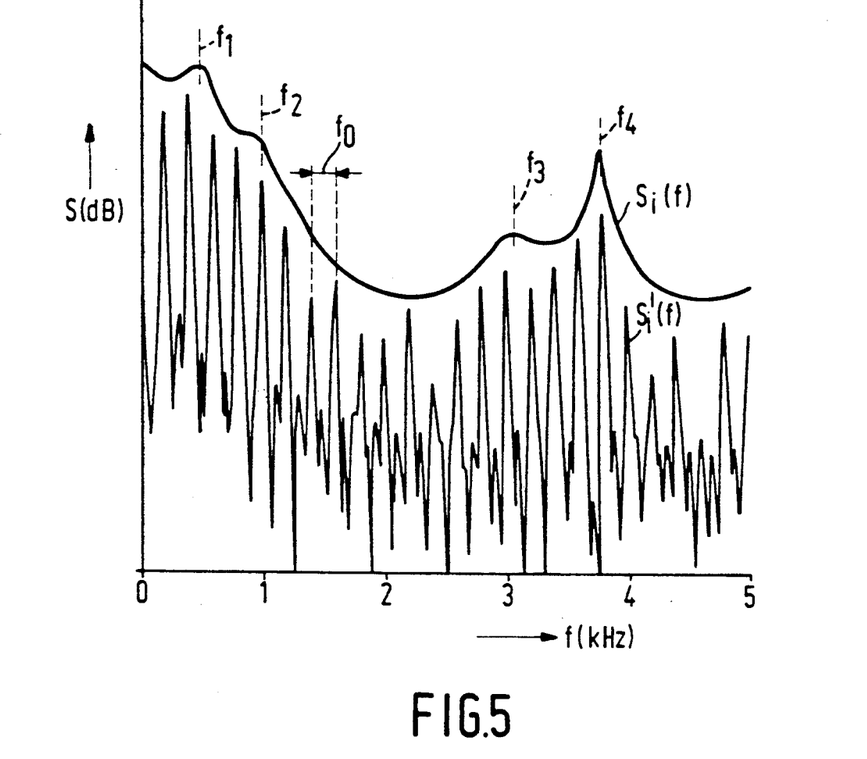

FIG. 5 shows the frequency spectrum of the speech utterance for the curve $S_i'(f)$ for the interval i. This spectrum can be obtained by means of a fast Fourier transform. The striking features in the curve $S_i'(f)$ are the peaks at $f = f_o$ and multiples of these. The frequency $f_o$ indicates the pitch of the speech signal. The curve $S_i(f)$ indicates the spectral envelope obtained by means of LPC analysis which is shifted upwards over a number of dB. The peaks in this curve at the frequency values $f_1$, $f_2$, $f_3$ and $f_4$ indicate the first four formants. In fact, all of the parameters of a filter built up of a number of second-order filters (in this case four) connected in series are determined with the LPC techniques. The relevent parameters are then the resonance frequencies of these filters (which correspond to the above-mentioned formant frequencies) and the bandwidths, see the dissertation of Vogten (6), particularly §2.1.

With these parameters it is then possible to synthesize speech afterwards, see the publication "MEA 8000 voice synthesizer, principles and interfacing"(7), particularly the section entitled "Principles of formant speech synthesis" on pages 2–4.

Figure 6:
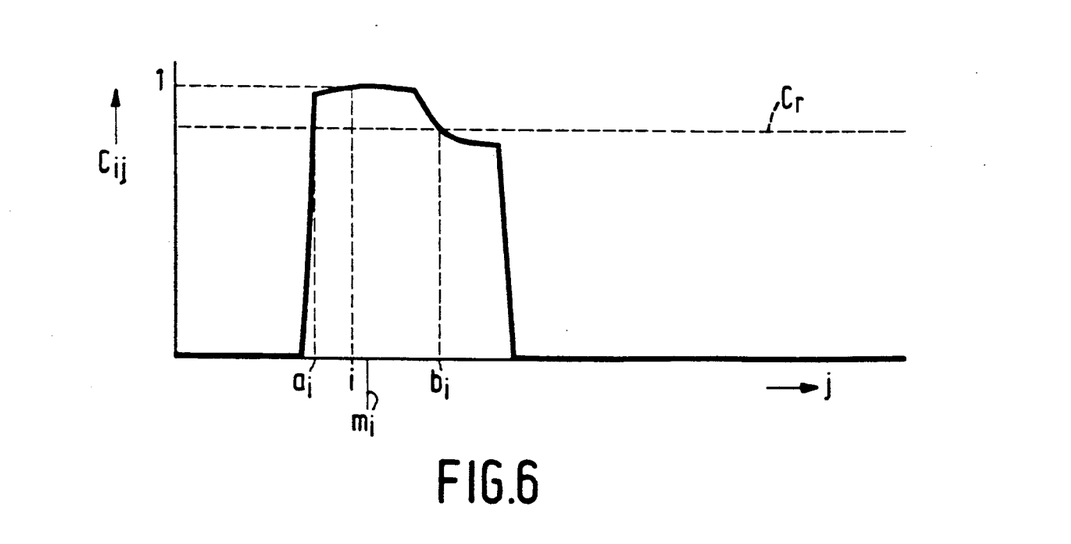
Figure 7:
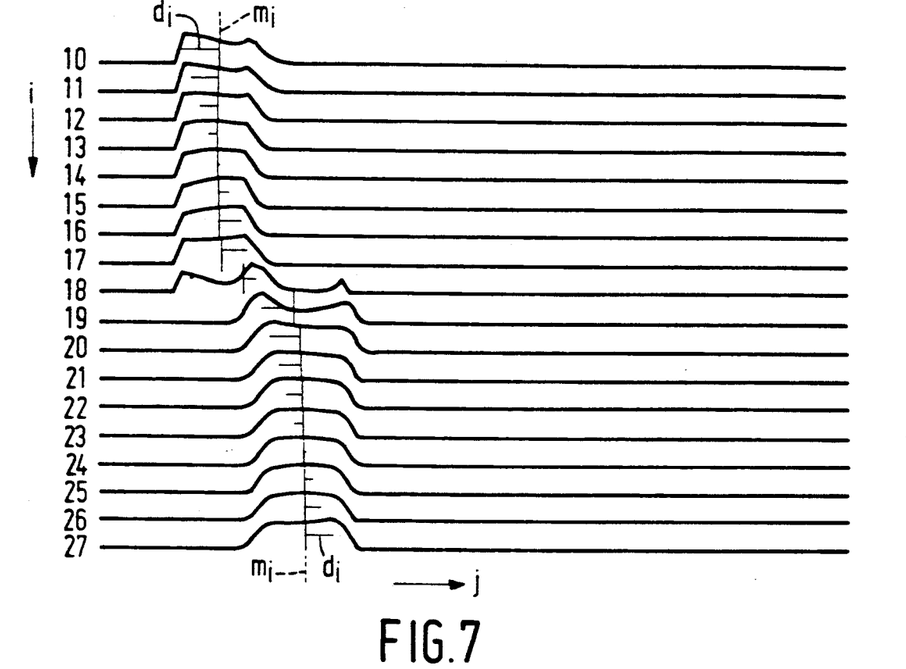

A second unit 7 has its input 8 coupled to the output 6 of the first unit 4. Making use of the N signals $S_i(f)$, see FIG. 4, which are presented by the first unit 4 to its output 6, a function $c_{ij}$ is derived for each interval i in the second unit 7. Here j runs from $a_i$ (with $a_i < i$) to $b_i$ (with $b_i > i$). FIG. 6 shows such a curve $c_{ij}$ and FIG. 7 shows for a number of successive time intervals i the curves $c_{ij}$, where $c_{ij}$ is calculated according to the following formulas:

$$R_{ij} = \int_0^{5\ kHz} S_i(f) S_j(f) df \quad (1)$$

and $$C_{ij} = \frac{R_{ij}}{\sqrt{R_{ii} R_{jj}}} \quad (2)$$

From formula (2) it can be seen that $c_{ij}$ has the value 1 for $j = i$, see FIG. 6. The curve $c_{ij}$ indicates the degree of agreement of the spectral envelope for the time interval i and for the time interval j. From FIG. 7 it is clear that the spectral envelopes for the time intervals 10 to 17 inclusive have a great deal in common with each other. The same applies to the time intervals 19 to 27 inclusive. This can also be seen reasonably well in FIG. 4. There are parts of the speech signal in which the spectral envelopes strongly resemble each other, followed by a transition to a following stationary part. Each part therefore indicates that during such a part the above-mentioned parameters, such as the formants and their related bandwidths, are more or less constant in time.

A third unit 10 has its input coupled to the output 9 of the second unit 7. The third unit 10 has the curves $c_{ij}$ supplied to it from the second unit 7 and determines for the curves $c_{ij}$ pertaining to each interval the middle $m_i$ of this curve, for example in the following way:

$$m_i = \frac{\int_{a_i}^{b_i} j C_{ij} dj}{\int_{a_i}^{b_i} C_{ij} dj} \quad (3)$$

The values $a_i$ and $b_i$ can be chosen in a reasonably arbitrary manner. For preference, those values j will be taken for $a_i$ and $b_i$ for which it holds that $C_i$, $a_i = C_i$, $b_i = C_e$, see FIG. 6, in which $C_r$ is equal to $p.c_{ii}$ ($c_{ii}$ being the maximum value in the curve $c_{ij}$, in this case equal to 1). For preference, p should be taken equal to 0.8 or 0.9. By choosing these values for $a_i$ and $b_i$ one obtains a more accurate determination of the value $m_i$ than if the integration in formula (3) were allowed to extend from 1 to N, i.e. over the entire speech utterance. In this latter case more or less stationary sections elsewhere in the speech utterance, which strongly resemble the section for which the middle is to be determined, would seriously interfere with the determination of that middle. For example: in the word "nenoone" more or less constant sections occur three times which correspond to the phoneme "n". If the middle $m_i$ is to be determined in the constant section of the middlemost "n", then the integration field must not be chosen so large that one of the other phonemes "n" falls within it.

The value j, corresponding to the middle $m_i$ for each interval, is indicated by a vertical line in FIG. 7. It can clearly be seen that the middle within a stationary section, $10 < j < 17$ and $20 < j < 27$, practically does not change for the following i.

A fourth unit 13 has its input 14 coupled to the output 12 of the third unit 10. The fourth unit 13 determines in block 15 the variable $d_i$ from the data obtained in the third unit 10.

For the function $d_i$ we have:

$$d_i = m_i - i \quad (4)$$

In FIG. 7 $d_i$ for every interval i is indicated by means of the horizontal connecting line between i and $m_i$. In addition, FIG. 3b shows the curve $d_i$ as a function of i. The zero-axis crossings from positive to negative in the function $d_i$ correspond at least approximately to the middle values $m_i$ in the pertaining stationary part. The zero-axis crossings from negative to positive, indicated by $i_1$ to $i_m$ inclusive, give the positions of the transitions between the stationary sections (phonemes). These zero-axis crossings are determined in block 16 of the fourth unit 13.

From FIG. 3b in combination with FIG. 3c it becomes clear that the first and last segment SI correspond to the silence just before and immediately after the speech utterance. Next, there are still six segments left which correspond precisely to the six phonemes from which the work "nenoone" is built up. The correct phoneme can thus be directly allocated to these six segments.

It may sometimes happen that by using the segmentation procedure described above, more or fewer segments are obtained than the number of phonemes from which the speech utterance is built up. In that case, a certain phoneme cannot be allocated directly to a segment. In order to be able to correctly allocate phonemes to segments in those cases as well, the arrangement is further equipped with a memory 18. In this memory the following are stored for each phoneme x: one reference pattern of the phoneme and the minimum and maximum duration ($t_{x,min}$ and $t_{x,max}$) of the phoneme. This reference pattern consists of the formant values and the related bandwidths. Starting from these values a spectral envelope S(f) can be calculated according to the LPC analysis as shown in FIG. 5. This spectral envelope is the envelope pertaining to a certain phoneme x and from now on will be indicated by $S_{px}(f)$.

Figure 8:
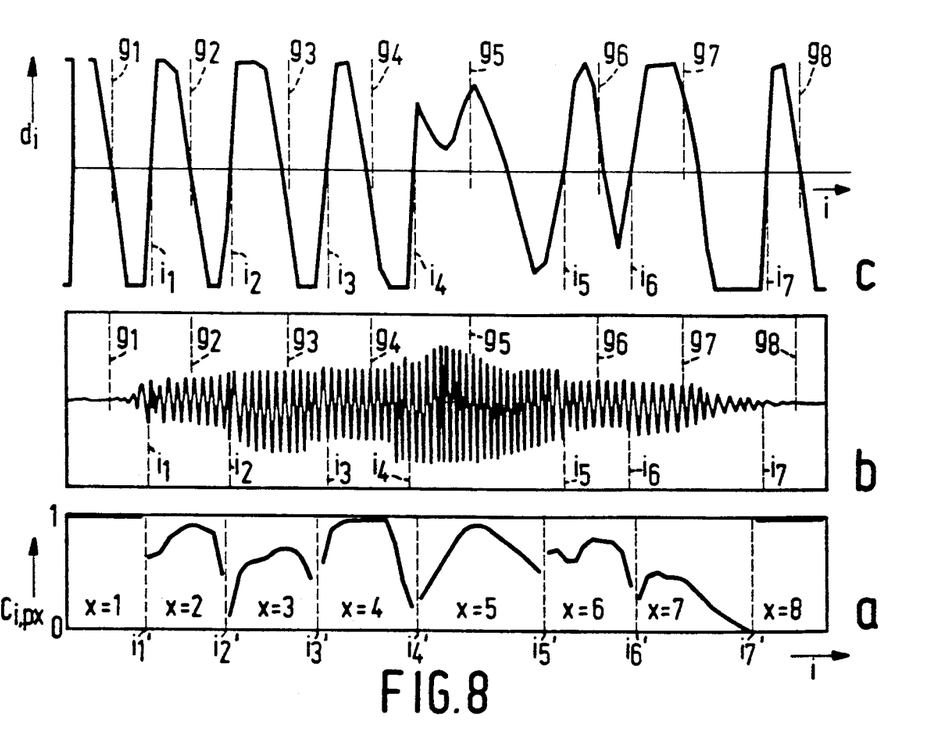

By analogy with formulas (1) and (2) the variable $C_{i,px}$ can now be derived, indicating the agreement between the spectral envelope of the time signal in interval i and of the phoneme x. This takes place in the fifth unit 19. For this purpose this unit has a first input 20, coupled to the memory 18 for supplying to unit 19 the reference patterns from which the envelopes $S_{px}(f)$ can be derived, and a second input 21 coupled to the output 6 of the first unit 4 for supplying the envelopes $S_i(f)$ pertaining to the time intervals i. In the fifth unit 19 the variables $c_{i,px}$ are derived and a time alignment is made between the speech utterance and a string of phoneme reference patterns, so that the degree of agreement between both signals is maximum. FIG. 8a shows the result of this time alignment for the speech utterance "nenoone", shown in FIG. 8b. In FIG. 8a x=1 represents the silence before the speech utterance, x=2 corresponds to the phoneme "n", x=3 to the phoneme "e", x=4 again to the phoneme "n", x=5 to the phoneme "oo", x=6 to the phoneme "n", x=7 again to the phoneme "e" and x=8 again to the silence.

Since this relates to a known speech utterance, we already know what phonemes are present and in what sequence they must occur. It is only a matter of determining the boundaries $i_1'$ to $i_7'$ inclusive.

Figure 10:
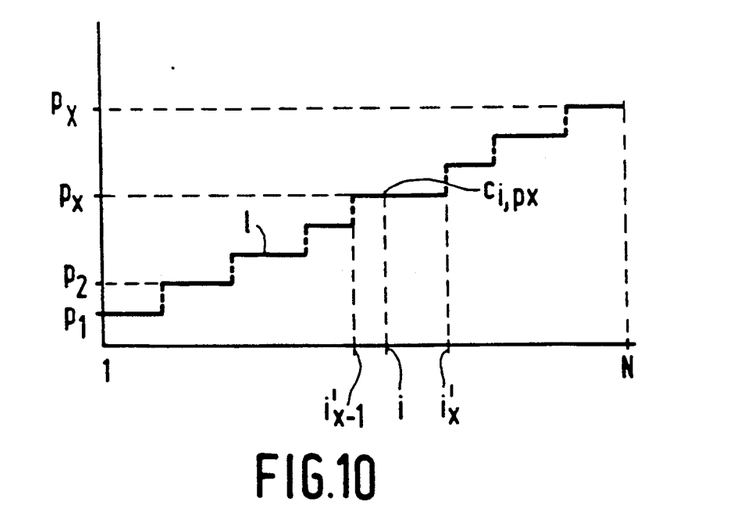

These boundaries can be determined as follows. In FIG. 10 the time is plotted along the horizontal axis, indicated in the sequential number i of the intervals i. Of course we have $1 \leq i \leq N$. The (reference patterns of the) phonemes $p_1$ to $p_x$ inclusive are plotted along the vertical axis. X is equal to 8 in the event of the silences before and after the speech utterance also being included as phonemes. The phonemes. The phoneme $p_x$ is located at the time intervals $i_{x-1}'+1$ to $i_x'$ inclusive. The values $c_{i,px}$ are always plotted on the line 1 running from bottom left to top right in the graph.

We now determine the values $i_x'$ (in which $1 \leq x \leq X$) in such a way that the function:

$$\sum_{x=1}^{X} \sum_{i_{x-1}'+1}^{i_x'}$$

$c_{i,px}$ in which $i_0'=0$ and $i_X'=N$, is maximum. This maximization can be carried out by means of dynamic programming in which conditions can be imposed on $i_x'$, such as:

$$t_{x,min} \leq i_x' - i_{x-1}' \leq t_{x,max}$$

Dynamic programming is a technique which is known in itself: see "Dynamic programming" by R. Bellman (8) and the publication by Ney (9) "Dynamic programming as a technique for pattern recognition". All the boundaries $i_1'$ to $i_7'$ inclusive are determined in the manner described above. Next, the boundaries $i_1$ to $i_7$ inclusive obtained from the segmentation procedure, and the boundaries $i_1'$ to $i_7'$ inclusive obtained from the time alignment are fed to a combination unit 23. For this purpose a first and a second input 24 or 25 of the combination unit 23 is coupled to an output 17 of the fourth unit 13 or to an output 22 of the fifth unit 19.

This combination unit 23 is equipped for allocating the phonemes obtained according to the time alignment in the unit 19 (see FIG. 8a) to those segments which are bounded by the values i, obtained according to the segmentation method in the unit 13 (see FIG. 3b and also FIG. 8c which displays that same curve), for which the boundaries of phonemes and the corresponding segment show the best agreement.

From FIGS. 8a and c it is clear that the boundaries $i_1$ and $i_1'$ belong together. The same applies to the boundaries $i_2$ and $i_2'$, $i_3$ and $i_3'$, $i_4$ and $i_4'$, $i_5$ and $i_5'$, $i_6$ and $i_6'$ and $i_7$ and $i_7'$. In this case the combination unit 23 therefore delivers the values $i_1$ to $i_7$ at its output.

Figure 9:
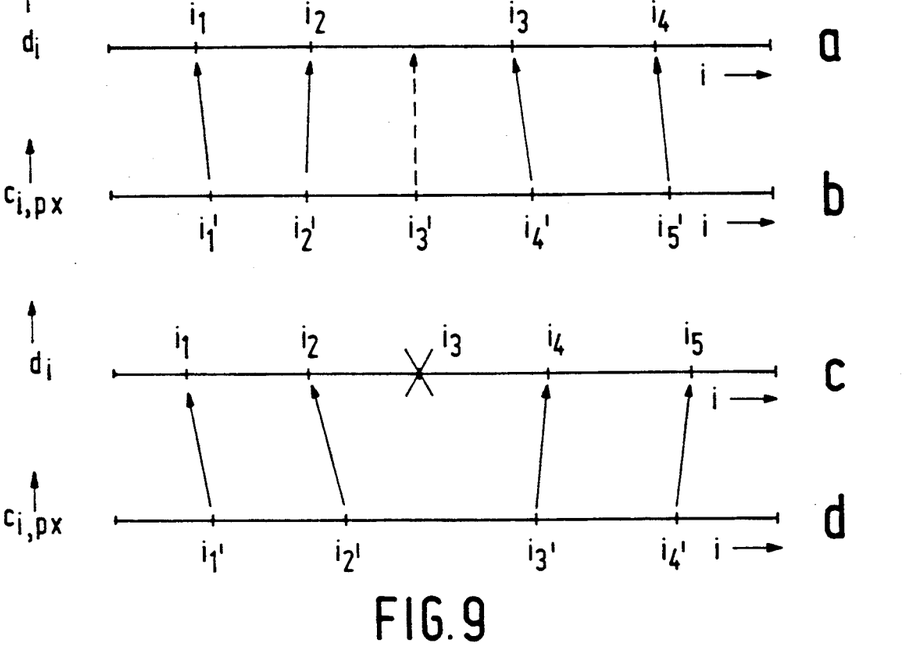

It might also have been the case that the segmentation procedure, for example, had delivered one segment less than the number of phonemes which make up the speech utterance. This is shown in FIGS. 9a and 9b. FIG. 9a shows the results of the segmentation procedure. The boundaries $i_1$ to $i_4$ inclusive are obtained from the curve $d_i$, which is not further shown here, while the speech utterance is built up of six phonemes. From the time alignment method there follow the boundaries $i_1'$ to $i_5'$ inclusive, as shown in FIG. 9b. The curve $C_{i,px}$ is not shown here. It is clear that agreement exits between the boundaries $i_1$ and $i_1'$, $i_2$ and $i_2'$, $i_3$ and $i_4'$ and $i_4$ and $i_5'$. In this case an extra boundary corresponding to $i_3'$ will be added by the combination unit 23.

Another possibility is that the segmentation procedure might precisely have delivered one segment more than the number of phonemes of which the speech utterance is built up. This is shown in FIGS. 9c and 9d. FIG. 9c shows the results of the segmentation procedure: five boundaries $i_1$ to $i_5$ inclusive. FIG. 9d shows the results of the time alignment: four boundaries $i_1'$ to $i_4'$ inclusive. It is clear that agreement exists between the boundaries $i_1$ and $i_1'$, $i_2$ and $i_2'$ and $i_4$ and $i_3'$ and $i_5$ and $i_4'$. In this case the boundary $i_3$ will be omitted by the combination unit.

The boundaries thus obtained and corrected, if necessary, are then supplied to the sixth unit 27. Starting from the boundaries i obtained by the combination unit 23 and making use of conversion rules as given in table I, the unit 27 determines the diphone boundaries $g_1$ to $g_8$ inclusive, see FIGS. 8b and 8c. Table I shows only the conversion rules for the most important and most commonly occurring diphones. The diphone located between $g_1$ and $g_2$ describes the transition from the silence to the "n", the diphone located between $g_2$ and $g_3$ the transition "ne", that located between $g_3$ and $g_4$: "en", that between $g_4$ and $g_5$: "noo", that between $g_5$ and $g_6$: "oon", that between $g_6$ and $g_7$: "ne" and that between $g_7$ and $g_8$ the transition between the "e" and silence. From table I no. 31 it is clear that $g_2$, $g_4$ and $g_6$ (must) lie in the middle of the segments defined by $i_1$, $i_2$; $i_3$, $i_4$ and $i_5$, $i_6$. From table I no. 12 it is clear that $g_3$ and $g_7$ must be taken six time intervals after $i_2$ and $i_6$, respectively. From table I no. 8 it follows that $g_5$ is located six intervals after $i_4$ along the i-axis and from table I no. 17 it follows that $g_1$ and $g_8$ must lie in the middle of the first and last segments.

The phonemes from table I, nos. 19 to 24 inclusive, are the plosives and consist of two parts. A first part corresponds to the silence before the plosion. The second part is the plosion itself, termed "burst" in the table. The segmentation procedure described above will generally segment these phonemes into two segments, corresponding to these two parts.

The related diphone boundary is now chosen according to table I at one time interval lying before the beginning of the segment corresponding to the plosion.

The "glottal stop" corresponds to the silence which is added during the pronunciation of separate letters, for example, in pronouncing the name of the speech synthesizer "MEA 8000", already mentioned.

In addition, conversion rules for deriving the most important German and English diphones will be found in tables II and III.

The diphones obtained in the manner described above are next stored in a memory 30 for the formation of a library of diphones. For this purpose, the memory 30 has two inputs coupled to the outputs 6 and 29 of the first unit 4 and the sixth unit 27, respectively. The following are stored in the memory 30 for each diphone and for each time interval lying within the boundaries g of the diphone.

the above-mentioned four (or five) formants and the related bandwidths, an amplitude parameter which is connected with the loudness (also derived in the first unit 4), a voiced-voiceless decision (i.e. whether it is a periodic signal or a noise-shape signal, also derived in the first unit 4).

With this information it is possible to realize synthetic speech afterwards, see the dissertation of Vogten (6).

Figure 2:
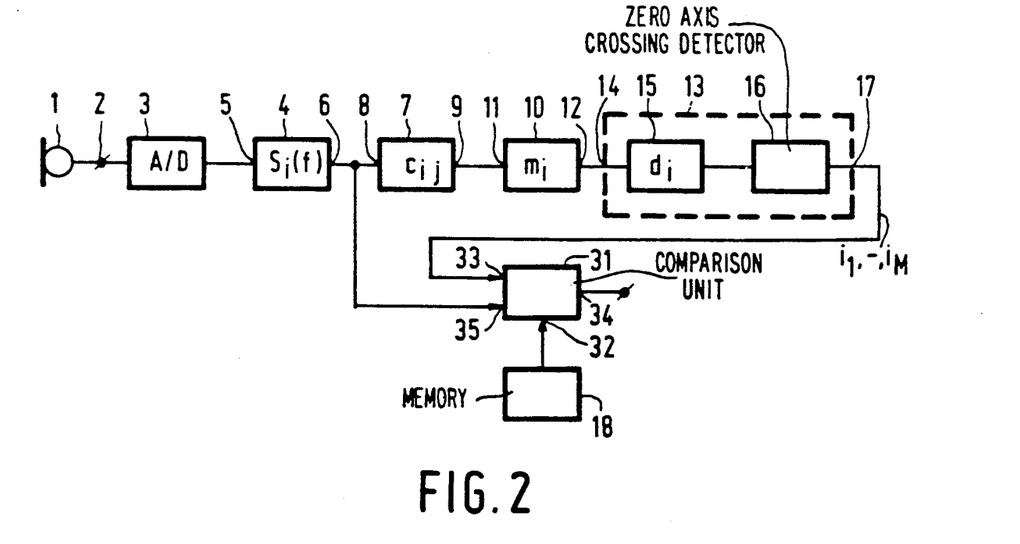

FIG. 2 shows a second example of an embodiment of the arrangement in accordance with the invention. The arrangement is used for the recognition of an unknown speech utterance. Similar reference numbers in FIGS. 1 and 2 represent the same elements. The unknown speech utterance is presented to the microphone 1 and converted into a digital signal in the A/D converter 3. The first unit 4 again delivers the functions $S_i(f)$, see FIG. 4. The second unit 7 determines the functions $c_{ij}$, see FIG. 7. The third unit 10 then determines the middle values $m_i$, see also FIG. 7. The fourth unit 13 determines the curve $d_i$ and the values $i_1, \ldots, i_M$, see FIG. 3.

We have now again obtained a number of segments which correspond, in principle, to as many reference patterns of the phonemes belonging to those segments of which the unknown speech utterance is built up. For this purpose, the memory 18 again contains the reference patterns of all the phonemes. The fifth unit 31 is equipped here for comparing each segment with the reference patterns of the phonemes and for allocating that phoneme to a segment for which the degree of agreement between this segment and the phoneme is maximum. For this purpose the fifth unit has a first, a second and a third input 32, 33 and 35, respectively, coupled to the memory, and to the output 17 of the fourth unit and to the output 6 of the first unit, respectively, and an output 34. At this output 34 there appears the information relating to the string of reference patterns of those phonemes which each show maximum agreement with the segment to which they are allocated. The unknown speech utterance is thus recognized.

The comparison of a segment with a reference pattern takes place, for example, as follows.

The curve $c_{i,px}$ is calculated for every segment and a reference pattern of a certain phoneme x. For a segment from the speech utterance and the reference pattern of that phoneme x which is also actually pronounced in the speech utterance, one obtains a curve $c_{i,px}$ as shown in FIG. 8a by the curve between, for example, $i_3'$ and $i_4'$. To this it should be added that the boundaries cannot lie at $i_3'$ and $i_4'$ but at $i_3$ and $i_4$ obtained from the curve $d_i$. The comparison therefore takes place between the reference pattern of a phoneme and a segment bounded by the values i obtained from the fourth unit 13, in other words $i_1$ to $i_M$ inclusive.

In a comparison between a segment of the speech utterance and another reference pattern a $c_{i,px}$ with a much lower value will be obtained. Next, that phoneme x for which $c_{i,px}$ (integrated over the segment) has the highest value will be allocated to a segment. One then determines, for example $$o_x = \frac{1}{i_{l+1} - i_l} \int_{i_l}^{i_{l+1}} C_{i,px} dx$$

in which $i_l$ and $i_{l+1}$ are the lower and upper boundaries of the segment. That phoneme x is now allocated to the said segment for which $O_x$ has the highest value.

If this procedure is applied to each segment, one ultimately finds the series of linked phonemes of which the speech utterance is built up. The speech utterance is thus recognized.

It should be added that the invention is not confined to only the examples of embodiment shown. Various modifications of the examples of embodiment described are possible without deviating from the invention as defined by the claims.

TABLE I

Rules for converting phoneme boundaries to diphone boundaries for the most important phonemes of the Dutch language.

| Phoneme number | Phoneme | Example | Diphone boundary |
|---|---|---|---|
| 1 | I | pit | 5 intervals after beginning of phoneme |
| 2 | i | liep | 6 intervals after beginning of phoneme |
| 3 | ε | les | 6 intervals after beginning of phoneme |
| 4 | e | lees | 6 intervals after beginning of phoneme |
| 5 | a | mat | 6 intervals after beginning of phoneme |
| 6 | ɑ | maat | 10 intervals after beginning of phoneme |
| 7 | ɔ | rot | 6 intervals after beginning of phoneme |
| 8 | o | rood | 6 intervals after beginning of phoneme |
| 9 | u | roet | 5 intervals after beginning of phoneme |
| 10 | y | fuut | 5 intervals after beginning of phoneme |
| 11 | œ | put | 5 intervals after beginning of phoneme |
| 12 | ə | de | 6 intervals after beginning of phoneme |
| 13 | au | koud | 8 intervals after beginning of phoneme |

TABLE I-continued

Rules for converting phoneme boundaries to diphone boundaries for the most important phonemes of the Dutch language.

| Phoneme number | Phoneme | Example | Diphone boundary |
|---|---|---|---|
| 14 | y | muis | 8 intervals after beginning of phoneme |
| 15 | | keus | 10 intervals after beginning of phoneme |
| 16 | eI | reis | 8 intervals after beginning of phoneme |
| 17 | # | stilte | middle of the phoneme |
| 18 | @ | glottal stop | middle of the phoneme |
| 19 | p | pas | 1 intervals before burst |
| 20 | t | tas | 1 intervals before burst |
| 21 | k | kas | 1 intervals before burst |
| 22 | b | bas | 1 intervals before burst |
| 23 | d | das | 1 intervals before burst |
| 24 | g | goal | 1 intervals before burst |
| 25 | s | sok | middle of the phoneme |
| 26 | f | fok | middle of the phoneme |
| 27 | x | gok | middle of the phoneme |
| 28 | z | zeer | middle of the phoneme |
| 29 | v | veer | middle of the phoneme |
| 30 | m | meer | middle of the phoneme |
| 31 | n | neer | middle of the phoneme |
| 32 | η | bang | middle of the phoneme |
| 33 | l | lang | middle of the phoneme |
| 34 | r | rang | middle of the phoneme |
| 35 | w | wang | middle of the phoneme |
| 36 | j | jan | middle of the phoneme |

TABLE II

Rules for converting phoneme boundaries to diphone boundaries for the most important phonemes of the German language.

| Phoneme number | Phoneme | Example | Diphone boundary |
|---|---|---|---|
| 1 | I | ich | 4 intervals after beginning of phoneme |
| 2 | i | ihre | 7 intervals after beginning of phoneme |
| 3 | ε | elf | 4 intervals after beginning of phoneme |
| 4 | e | eben | 7 intervals after beginning of phoneme |
| 5 | a | April | 5 intervals after beginning of phoneme |
| 6 | a | aber | 10 intervals after beginning of phoneme |
| 7 | ə | Stunde | 3 intervals after beginning of phoneme |
| 8 | ɔ | Onkel | 4 intervals after beginning of phoneme |
| 9 | o | oder | 8 intervals after beginning of phoneme |
| 10 | u | und | 4 intervals after beginning of phoneme |
| 11 | u | Uhr | 7 intervals after beginning of phoneme |
| 12 | y | Buro | 4 intervals after beginning of phoneme |
| 13 | γ | ubel | 8 intervals after beginning of phoneme |
| 14 | œ | offentlich | 5 intervals after beginning of phoneme |
| 15 | ¢ | Ofen | 9 intervals after beginning of phoneme |
| 16 | ae | eifrig | 5 intervals after beginning of phoneme |
| 17 | # | Stille | middle of the phoneme |
| 18 | @ | glottal stop | middle of the phoneme |
| 19 | p | Pater | 1 interval before burst |
| 20 | t | Tat | 1 interval before burst |
| 21 | k | Kater | 1 interval before burst |
| 22 | b | Bad | 1 interval before burst |
| 23 | d | da | 1 interval before burst |
| 24 | g | Gabel | 1 interval before burst |

TABLE II-continued

Rules for converting phoneme boundaries to diphone boundaries for the most important phonemes of the German language.

| Phoneme number | Phoneme | Example | Diphone boundary |
|---|---|---|---|
| 25 | s | das | middle of the phoneme |
| 26 | f | Fahrrad | middle of the phoneme |
| 27 | x | acht | middle of the phoneme |
| 28 | z | sehen | middle of the phoneme |
| 29 | ʃ | schon | middle of the phoneme |
| 30 | m | Mutter | middle of the phoneme |
| 31 | n | Natur | middle of the phoneme |
| 32 | η | Junge | middle of the phoneme |
| 33 | l | lang | middle of the phoneme |
| 34 | r | rot | middle of the phoneme |
| 35 | w | wahr | middle of the phoneme |
| 36 | j | ja | middle of the phoneme |
| 37 | h | hoffen | middle of the phoneme |
| 38 | oy | eure | 5 intervals after beginning of phoneme |
| 39 | ao | auch | 5 intervals after beginning of phoneme |
| 40 | ɛ | ich | middle of the phoneme |

TABLE III

Rules for converting phoneme boundaries to diphone boundaries for the most important phonemes of the English language.

| Phoneme number | Phoneme | Example | Diphone boundary |
|---|---|---|---|
| 1 | I | bis | 2 intervals after beginning of phoneme |
| 2 | i | bead | 7 intervals after beginning of phoneme |
| 3 | ε | bed | 2 intervals after beginning of phoneme |
| 4 | ʌ | bud | 2 intervals after beginning of phoneme |
| 5 | ei | bayed | 9 intervals after beginning of phoneme |
| 6 | ai | bide | 9 intervals after beginning of phoneme |
| 7 | ɔ | hot | 2 intervals after beginning of phoneme |
| 8 | ɔi | foil | 9 intervals after beginning of phoneme |
| 9 | u | hood | 2 intervals after beginning of phoneme |
| 10 | au | bowed | 9 intervals after beginning of phoneme |
| 11 | iə | beard | 9 intervals after beginning of phoneme |
| 12 | ə | sitter | 2 intervals after beginning of phoneme |
| 13 | εə | bared | 9 intervals after beginning of phoneme |
| 14 | uə | poor | 9 intervals after beginning of phoneme |
| 15 | ae | bad | 3 intervals after beginning of phoneme |
| 16 | ə | bird | 7 intervals after beginning of phoneme |
| 17 | # | silence | middle of the phoneme |
| 18 | @ | glottal stop | middle of the phoneme |
| 19 | p | pin | 1 interval before burst |
| 20 | t | tin | 1 interval before burst |
| 21 | k | kin | 1 interval before burst |
| 22 | b | bin | 1 interval before burst |
| 23 | d | din | 1 interval before burst |
| 24 | g | gap | 1 interval before burst |
| 25 | s | sin | middle of the phoneme |
| 26 | f | fin | middle of the phoneme |
| 27 | ʒ | pleasure | middle of the phoneme |
| 28 | z | zip | middle of the phoneme |
| 29 | ʃ | shin | middle of the phoneme |
| 30 | m | map | middle of the phoneme |
| 31 | n | nap | middle of the phoneme |
| 32 | η | hang | middle of the phoneme |
| 33 | l | lap | middle of the phoneme |

TABLE III-continued

Rules for converting phoneme boundaries to diphone boundaries for the most important phonemes of the English language.

| Phoneme number | Phoneme | Example | Diphone boundary |
| --- | --- | --- | --- |
| 34 | r | rap | middle of the phoneme |
| 35 | w | win | middle of the phoneme |
| 36 | j | yes | middle of the phoneme |
| 37 | h | hip | middle of the phoneme |
| 38 | θ | thin | middle of the phoneme |
| 39 |  | this | middle of the phoneme |

REFERENCES

1. B. A. G. Elsendoorn, J.'t Hart: Exploring the possibilities of speech synthesis with Dutch diphones. IPO Annual Progress Report no. 17, 1982, pp. 63-5.
2. M. Stella: Fabrication semi-automatique de dictionnaires de diphones. Recherche/Acoustique, Centre National d'Etudes de Télécommunication, vol. VII, 1982/83, pp. 53-63.
3. L. R. Rabiner, A. E. Rosenberg, J. G. Wilpon, T. M. Zampini: A bootstrapping training technique for obtaining demisyllable reference patterns. J. Acoust. Soc. America, 71(6), June 1982, pp. 1588-95.
4. B. S. Atal: Efficient coding of LPC-parameters by temporal decomposition. Proc. of the ICASSP '83 (Boston), pp. 81-4.
5. J. D. Markel, A. H. Gray, Linear prediction of speech. Springer Verlag 1976.
6. L. L. M. Vogten: Analyse, zuinige codering en resynthese van spraakgeluid. Thesis, Technische Hogeschool Eindhoven 1983.
7. MEA 8000 Voice synhtesizer, principles and interfacing. Philips'Elcoma publication no. 101.
8. R. Bellman: Dynamic programming. University Press, Princeton, N.J., 1957.
9. H. Mey: Dynamic programming as a technique for pattern recognition Proc. of the 6th Int. Conf. on Pattern recognition, Munich (DE), Oct. 19-22, 1982, pp. 1119-25.

What is claimed is:

1. A process for the segmentation of speech into a number of segments which comprises: converting an acoustic speech signal into N signals (N being an integer >1), each signal pertaining to a time interval i of N successive time intervals, in which i runs from 1 to N inclusive,
for successive time intervals i, deriving a function $c_{ij}$ which is a measure of similarity between the signal pertaining to the timer interval i and a signal pertaining to a time interval j, whereby for a certain value of i, j runs from $a_i(a_i<i)$ up to an including $b_i(b_i>i)$, and determining those values i which form boundaries of parts of the acoustic speech signal within which time intervals i occur and whose corresponding function $c_{ij}$ approximately correspond.

2. A process according to claim 1, which further comprises:
determining for each time interval i, a middle $m_i$ of the function $c_{ij}$ pertaining to the interval i, and for the said values i, taking those values i which approximately correspond to zero-axis crossings with the same sign in a function $d_i$, indicating the difference between $m_i$ and the number i of the time interval to which $m_i$ belongs.

3. A process according to claim 2, characterized in that those values i are determined which approximately correspond to zero-axis crossings from negative to positive in the function $d_i$, where $d_i = m_i - i$.

4. A process according to claim 2 or 3, characterized in that $a_i$ and $b_i$ are taken equal to those values i for which the function $c_{ij}$ is equal to a reference value $c_r$.

5. A process according to claim 4, characterized in that the reference value is equal to p times a maximum value of the function $c_{ij}$, where a $p<1$, and preferably $<0.8$.

6. A process according to claim 4, wherein the reference value is equal to p times a maximum value of the function $c_{ij}$, where p is greater than zero and less than one.

7. A process according to claim 2 or 3, which comprises taking frequency spectra of the N signals of the acoustic speech signal in the N time intervals.

8. A process according to claim 2 or 3, which comprises taking spectral envelopes of the N signals of the acoustic speech signal in the N time intervals.

9. A process according to claim 1, 2 or 3, in the form of a segmentation step for the segmentation of the speech signal of a known speech utterance into a string of said number of segments, the known utterance comprising a string of known reference sounds with a reference pattern available for each known reference sound, further comprising a time alignment step for achieving a maximum degree of agreement between a string of reference patterns corresponding to the string of known reference sounds and the known speech utterance, and followed by the step of allocating reference sounds in the string of reference sounds making up a speech utterance to segments in the string of segments obtained in the segmentation step.

10. A process according to claim 9, characterized in that where one reference sound is allocated to two adjacent segments, the value i for the boundary between these two segments is omitted and where two reference sounds are allocated to one segment, the boundary between the two sounds is added to the group of values i.

11. A process according to claim 10, which comprises, starting from the group of values i obtained in accordance with claim 9, deriving diphone boundaries by making use of conversion rules.

12. A process according to claim 1, 2 or 3, characterized in that for recognition of a speech signal of an unknown speech utterance, each segment is compared with reference patterns of known sounds, and in that that sound is allocated to a segment for which the degree of similarity between the segment and the reference sound is maximum.

13. An arrangement for the segmentation of speech in which an acoustic signal is converted into N signals each pertaining to a time interval i of N successive time intervals ($1 \leq i \leq N$) comprising: an input terminal for reception of an electrical signal corresponding to an acoustic speech signal, a first unit with an input coupled to the input terminal and an output, said first unit including means for deriving the N signals and for supplying the N signals to its output, the improvement comprising:
a second unit with an input coupled to the output of the first unit and an output, said second unit including means for deriving a function $c_{ij}$ for successive intervals i from signals pertaining to the time intervals i and signals pertaining to time intervals j and for supplying the function $c_{ij}$ to its output, wherein j runs from $a_i$ ($a_i < i$) through $b_i$ ($b_i > i$), and a sub-arrangement with an input coupled to the output of the second unit and an output, said sub-arrangement including means for determining the values i for the boundaries of parts of the speech signal within which time intervals i lie and whose corresponding functions $c_{ij}$ approximately correspond.

14. An arrangement according to claim 13 characterized in that the sub-arrangement comprises:

a third unit with an input coupled to the input of the sub-arrangement and an output, said third unit including means for deriving a middle $m_i$ of the function $c_{ij}$ pertaining to each interval i and for supplying the values $m_i$ to its output, and a fourth unit with an input coupled to the output of the third unit and an output coupled to the output of the sub-arrangement, said fourth unit including means for determining those values i which approximately correspond to zero-axis crossings in a function $d_i$ which indicates the difference between $m_i$ and the number i of the time interval to which $m_i$ belongs and for supplying said values i to its output.

15. An arrangement according to claim 14, characterized in that the fourth unit further comprises means for determining those values i which approximately correspond to zero-axis crossings from negative to positive in the function $d_i$, in which $d_i = m_i - i$.

16. An arrangement according to claim 14, characterized in that the first unit includes means for deriving the N signals in the form of spectral envelopes of the acoustic speech signal in the N time intervals.

17. An arrangement according to one of claims 14, 15 or 16, further comprising a memory for storing reference patterns, a fifth unit with a first input coupled to an output of the memory, a second input coupled to the output of the first unit and an output, said fifth unit including means for achieving by means of a time alignment a maximum degree of agreement between a string of reference patterns of those sounds from which a known speech utterance is built up and the speech signal of a speech utterance, and for supplying boundaries obtained in this way to its output, and a combination unit with a first input coupled to the output of the fourth unit and a second input coupled to the output of the fifth unit and an output, said fifth unit including means for allocating those sounds to segments bounded by the values i for which the boundaries of sound and corresponding segment show the best agreement.

18. An arrangement according to claim 17, characterized in that the combination unit further comprises means for adding and omitting a number of one or more boundaries, the number of which equals the difference between the number of boundaries for the segments and the number of boundaries for the reference sounds, so as to obtain an in number amended group of boundaries, and for supplying the in number amended group of boundaries to its output.

19. An arrangement according to claim 18, further comprising a sixth unit, with an input coupled to the output of the combination unit and an output, which sixth unit, starting from values i of the combination unit for the sound boundaries and making use of conversion rules, includes means for deriving diphone boundaries and for supplying said diphone boundaries to its output.

20. An arrangement according to claims 14 or 15, further comprising a memory for storing reference patterns of known sounds and a fifth unit with a first input coupled to an output of the memory, a second input coupled to the output of the fourth unit and a third input coupled to the output of the first unit and an output, said fifth unit including means for comparing each segment with reference patterns of known sounds, and for allocating that sound to a segment for which the degree of agreement between said segment and the sound is maximum, and means for supplying to its output information relating to the string of reference patterns of those sounds each of which corresponds maximally with the segment to which they are allocated.

* * * * *